United States Patent [19]
McIntosh

[11] Patent Number: 5,982,767
[45] Date of Patent: Nov. 9, 1999

[54] MERGED TELEPHONE AND DATA NETWORK

[75] Inventor: Evan McIntosh, Ontario, Canada

[73] Assignee: Mitel Corporation, Kanata, Canada

[21] Appl. No.: 08/827,161

[22] Filed: Mar. 27, 1997

Related U.S. Application Data

[60] Provisional application No. 60/018,707, May 30, 1996.

[51] Int. Cl.⁶ .................................................. H04L 12/66
[52] U.S. Cl. .......................... 370/352; 370/395; 370/401
[58] Field of Search ................................... 370/352, 356, 370/466, 395, 397, 401, 404, 490, 493, 487, 498

[56] References Cited

U.S. PATENT DOCUMENTS

| | | |
|---|---|---|
| 4,843,606 | 6/1989 | Bux et al. . |
| 4,866,704 | 9/1989 | Bergman . |
| 4,958,341 | 9/1990 | Hemmady et al. ...................... 370/352 |
| 5,453,987 | 9/1995 | Tran . |
| 5,533,018 | 7/1996 | DeJager et al. .......................... 370/352 |
| 5,740,231 | 4/1998 | Cohn et al. .............................. 370/401 |

FOREIGN PATENT DOCUMENTS 0707432   4/1996   European Pat. Off. .

*Primary Examiner*—Chi H. Pham
*Assistant Examiner*—Maikhanh Tran
*Attorney, Agent, or Firm*—Marks & Clerk

[57] ABSTRACT

A merged voice and data communications system, comprises a TDM-based broadband backbone carrying packet data, a plurality of LAN segments interconnected via said broadband backbone, a plurality of telephone subsystems, each comprising a plurality of telephone circuits connected to a subsystem multiplexer, and a central telephone controller. Circuits are established to carry telephone traffic over said broadband backbone between the central controller and several subsystem multiplexers independently of the packet data. Telephone calls can be routed over the broadband backbone to any of the telephone circuits without interfering with the packet data and without requiring separate physical links.

9 Claims, 6 Drawing Sheets

MERGED TELEPHONE AND DATA NETWORK

This invention claims priority under 35 USC 119(e) from U.S. Provisional patent application No. 60/018,707 filed on May 30, 1996.

FIELD OF THE INVENTION

This invention relates to a merged telephone and data network suitable, for example, for campus wide applications having a large number of telephone extensions, up to two thousand or more.

BACKGROUND OF THE INVENTION

Current practice is generally to employ different networks for telephone and data applications. A business may have a wired telephone system connected to a Private Branch Exchange (PBX) and a separate network of LAN segments connected together over a broadband backbone. This means duplication of cabling, leading to higher physical complexity and cost. Data traffic is by its nature fundamentally different from voice traffic due to its bursty nature and the fact that it does not need to be delivered in a time critical fashion. A computer file can be transferred as bandwidth becomes available, and the file can still be correctly assembled at the receiving end. This is not true of voice traffic, which must be delivered in a time sensitive manner in order to be intelligible to the receiver.

New ATM (Asynchronous Transfer Mode) technology will eventually allow the complete integration of voice and data. The migration to ATM, however, requires a complete replacement of existing systems and therefore is extremely expensive for organizations with existing PBX systems.

A need arises for a technology that can provide a painless migration from existing dual-wired systems to a more integrated system without making existing equipment obsolete and thus wasting existing capital investment.

SUMMARY OF THE INVENTION

According to the present invention there is provided a merged voice and data communications system, comprising a TDM-based broadband backbone carrying packet data; a plurality of LAN segments interconnected via said broadband backbone; a plurality of telephone subsystems, each comprising a plurality of telephone circuits connected to a subsystem multiplexer; a central telephone controller; and means for establishing circuits to carry telephone traffic over said broadband backbone between said central controller and said several subsystem multiplexers independently of said packet data; whereby telephone calls can be routed over said broadband backbone to any of said telephone circuits without interfering with the packet data.

In one embodiment, bandwidth is reserved for telephone channels over the broadband backbone so that the channels carrying telephone traffic are isolated from the packet data. These channels are established over the reserved bandwidth between the central controller and any of the several subsystem multiplexers.

In another embodiment, the channels are, for example, permanent virtual channels established over an ATM network.

The LAN segments might, for example, be associated with individual floors, each floor being connected to a SONET backbone. Timeslots are reserved in the SONET frame to accommodate the telephone channels and these are kept separate from the timeslots carrying floating ATM cells.

The subassembly on each floor consists of a separate wired system consisting of two-wire pairs extending from the multiplexer to the telephone sets. Thus, at the floor level, the invention works like an existing system. However, it is not necessary to carry the wires from the individual telephone sets all the way back to the central controller, for example a Mitel LIGHT™ SX2000 control node, as would be the case in the prior art.

The subsystem multiplexers may be Mitel LIGHT™ telephone nodes connected to multinet hubs which merge the telephone and data traffic.

The invention thus permits the integration of voice and data backbone transport to reduce infrastucture costs through use of common fiber cabling structures. In one embodiment, the integration is done by physical layer (SONET) multiplexing or the voice TDM stream from each LIGHT node (16 Mb/sec used, or 256@64 Kbs channels). The invention delivers the first level on management integration by allowing this to be done from a single HP/Openview open management platform. Voice switching (64 Kb channels) is still handled by the Main Control TDM circuit switch matrix function.

In another embodiment, the voice TDM streams for each LIGHT node are converted to ATM Cells, which are multiplexed at the ATM layer on the OC3 backbone. This embodiment allows the LANNET backbone telephony module (LBT) to be connected to a customer premises private ATM Switch network rather than on a point to point (LBT to LBT) basis. The Main Control node connects directly to the ATM network over an OC3 link and each LIGHT peripheral/Network Gateway node connects via the (LBT) module in each distributed hub. This allows a customer who has/wants an ATM backbone to use the invention. The OpsMgr software is an application running under HP/Openview network manager platform.

The invention has the advantage over a fully integrated ATM system that it does not require existing technology to be completely scrapped. The central controller and peripheral nodes can be conventional and continue to work independently of the LAN. The broadband backbone is in effect used as a transport medium to replace copper wiring from the controller to the nodes at the subsystem level.

BRIEF DESCRIPTION OF THE DRAWINGS

The invention will now be described in more detail, by way of example only, with reference to the accompanying drawings, in which:

FIG. 4 is an example of a maximum collapsed backbone configuration;

FIG. 5 is a block diagram of a workgroup hub;

DESCRIPTION OF THE PREFERRED EMBODIMENTS

Figure 1:
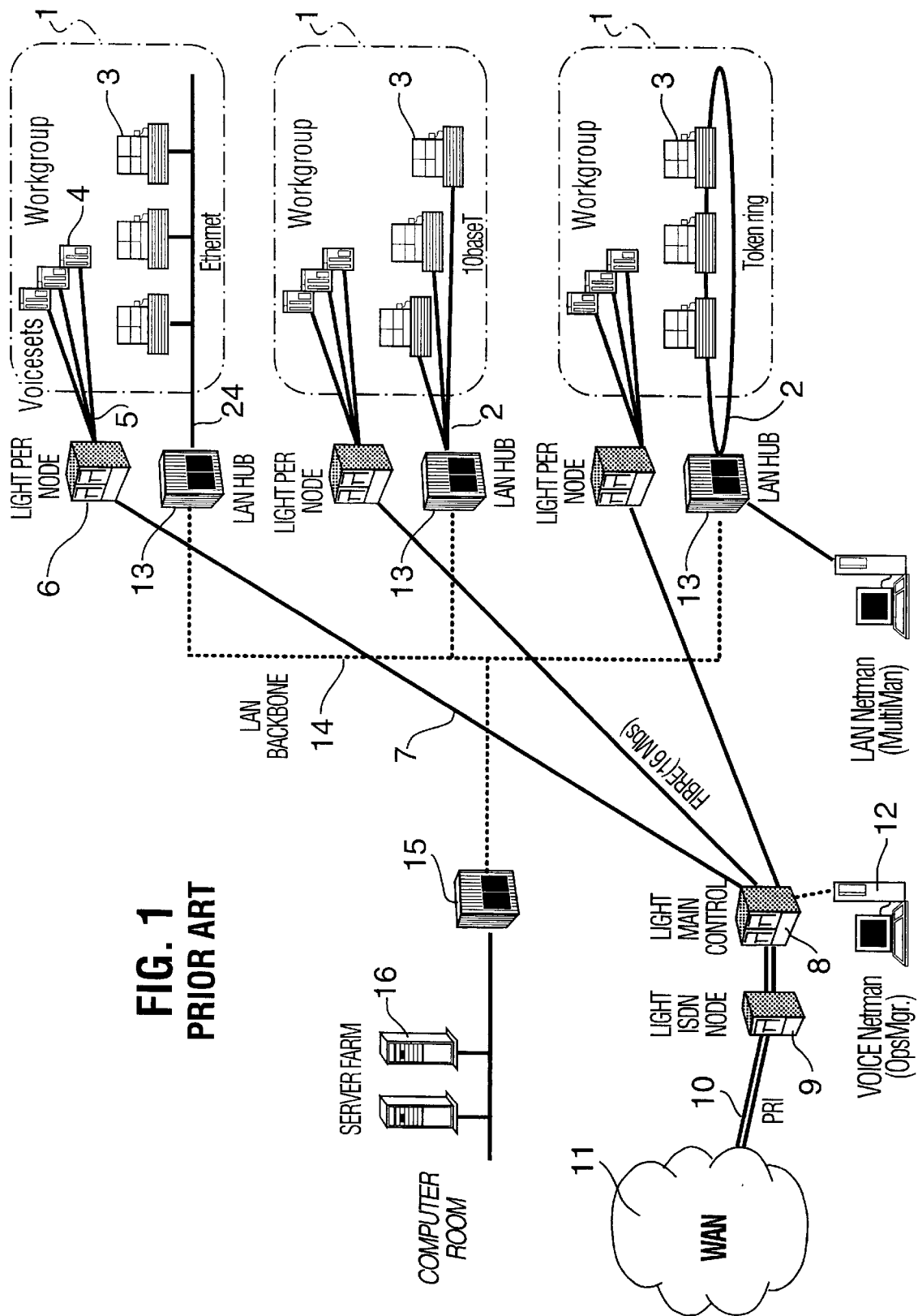
FIG. 1 is a block diagram of a prior art telephone and data system.

Referring to FIG. 1, workgroups 1 include computer terminals 3 connected to LAN segments 2, an Ethernet, 10baseT Ethernet, and Token ring network respectively. The workgroups are typically associated with a floor in a building.

Telephone sets 4 of each workgroup 1 are connected over physical telephone circuits 5 to Mitel LIGHT™ nodes 6 and from there via physical cabling to a Mitel LIGHT telephone controller 8. This is connected through an ISDN node 9 over a primary rate T1 link 10 to the public network 11. The controller 8 may be connected to an optional voice network manager 12. LAN segments 2 are connected via LAN hubs 13 to a backbone 14, in turn connected through LAN hub 15 to server farm 16.

In this arrangement the telephony system operates entirely independently of the data system embodied by the LANs.

Figure 2:
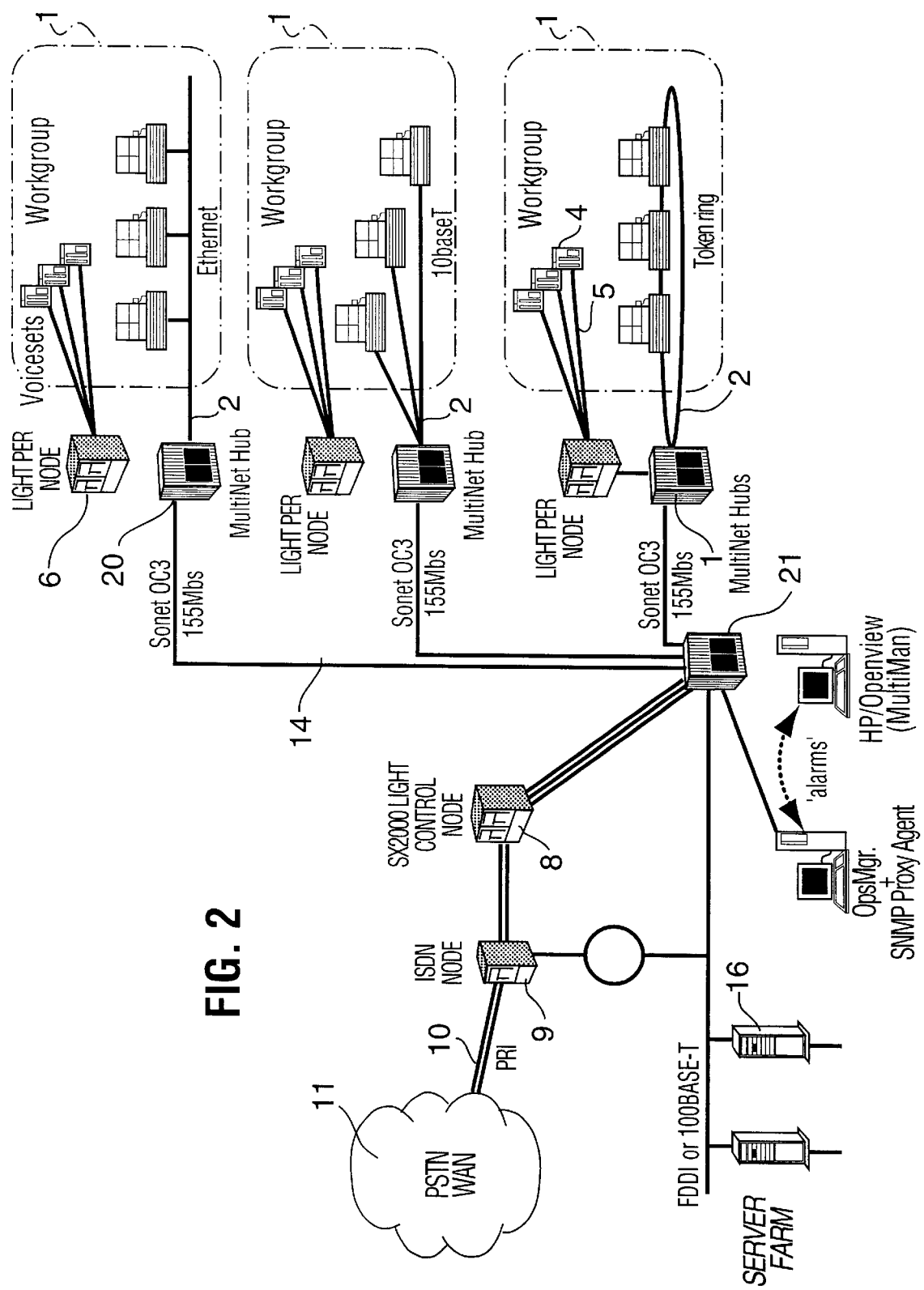
FIG. 2 is a block diagram of a merged telephone and data system in accordance with one embodiment of the invention.

Referring now to FIG. 2, which shows a system in accordance with the invention, the Mitel LIGHT nodes 6 associated with each workgroup 1, instead of being physically connected to the central controller 8, are connected to multinet hubs 20. From there they share bandwidth with data from the LANs over a broadband TDM backbone, such as a SONET OC3 155 Mbs backbone. This is implemented as a collapsed backbone (physical star) network with individual backbone spans connecting up to eleven distributed Workgroup Hubs 20 to a central Collapsed Backbone Hub 21. The Collapsed Backbone Hub 21 connects to single LIGHT Main Control Node 8.

The Workgroup hubs 20 typically support one LIGHT Peripheral Node, which supports up to 192 voice ports or desktop telephone sets in each distributed workgroup. A Workgroup hub 20 can also support other LIGHT nodes 6 such as a DSU Node, ISDN Node or Applications Gateway. The Collapsed Backbone Hubs and Workgroup Hubs support a variety of LAN technologies such as Ethernet, Token Ring, FDDI, 100BaseT in switched or shared media modes of operation.

Figure 3:
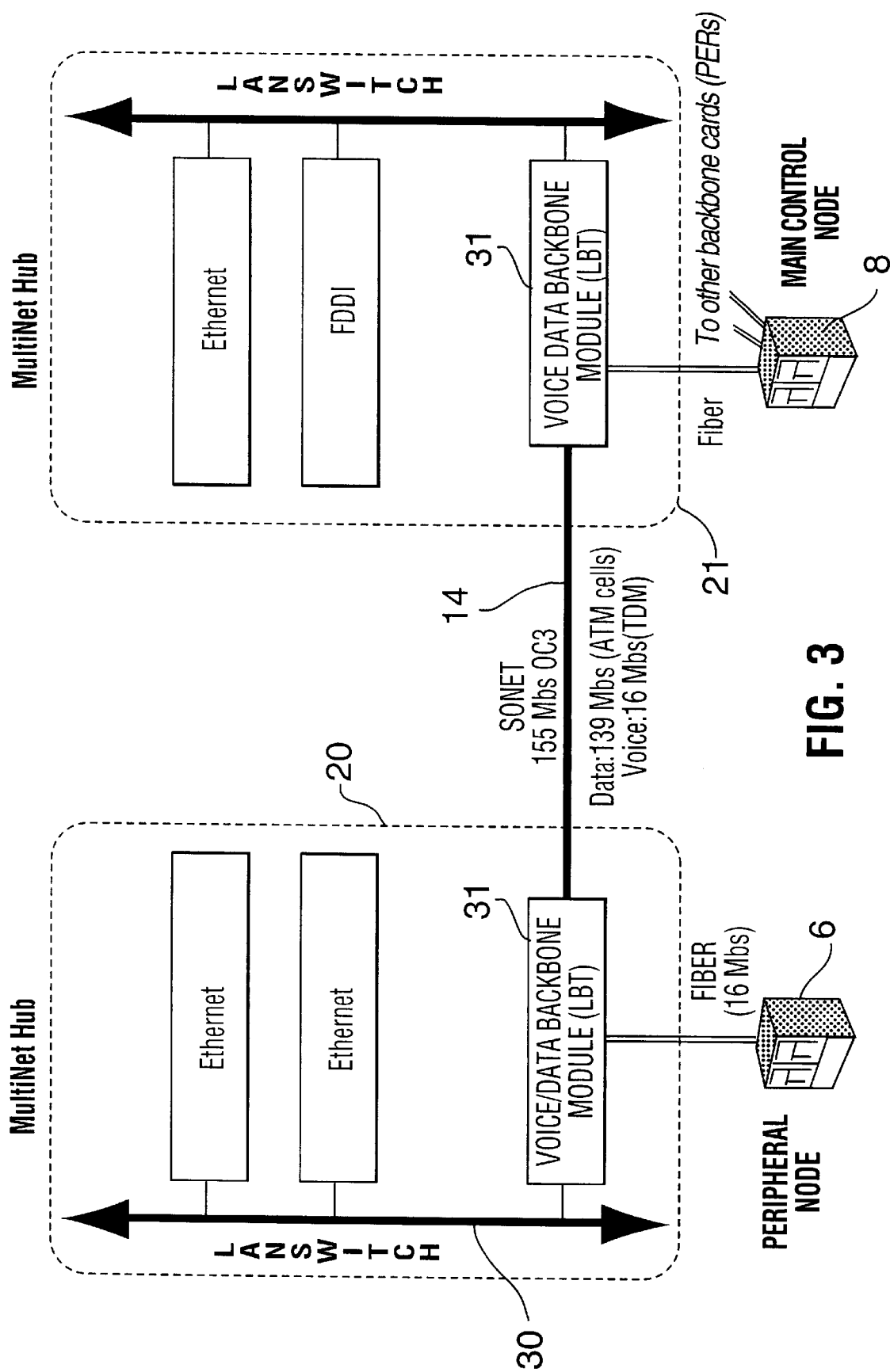
FIG. 3 shows an interface module for a workgroup hub.

Each backbone segment or point-to-point connection between the Collapsed Backbone Hub 21 and Workgroup Hub 20 requires an LBT-155 (LANNET BACKBONE TELEPHONY) backbone interface module 31 in each hub as shown in FIG. 3. The LBT155 module 31 takes Ethernet data packets from the LanSwitch Bus 30 and converts them to ATM data cells which are then multiplexed with the constant bit rate voice streams from LIGHT Nodes across the 155 Mbps OC3 fiberoptic backbone link. The LANSwitch bus 30 does not handle any LIGHT node voice traffic. LAN data traffic moving from a desktop PC one Workgroup Hub 20 to another Workgroup Hub 20 is switched first to the Collapsed Backbone Hub 21 and from there onto the proper backbone 'vertical' link to the destination Workgroup Hub 20 and the destination desktop PC.

The Collapsed Backbone Hub 21 (of which there can be several) normally also supports LAN connections to computing servers using high speed interfaces such as switched Ethernet (LSE-x08), FDDI (LSF-100), 100-BASE-T Ethernet (LSE-100) and ATM/OC3 (LSA-155).

The SX2000 LIGHT Main Control (MC) node 8 is an enterprise level server and provides basic voice call control plus advanced individual and telephony groupware features (e.g. hunt, broadcast, ACD groups).

The Main Control node 8 is typically be configured as fully redundant and located in the same physical area as other enterprise level servers.

Access to public wide area network (WAN) trunks and services is provided by LIGHT DSU (T1/E1 links) or ISDN Nodes (PRI links) 9, 10. The functionality of these nodes is identical to that of a conventional SX-2000 LIGHT system.

The nodes may be located in the same area as other enterprise level servers or near the building access point for WAN links. Network Gateway node can use either a direct connection to the LIGHT Main Control Node or may be connected over the backbone via a Workgroup Hub. If required analog trunk access can also be supported via analog trunk interface cards housed in a LIGHT Peripheral node as in existing LIGHT systems.

In one embodiment the ISDN Node 9 may allow the connection of remote LAN routers via a primary rate interface. This will allow aggregation of all off-premises voice and data traffic on common WAN digital trunks for more efficient use and management.

The system architecture assumes distributed workgroups in the enterprise. The Workgroup Hub supports various LAN interfaces required for PC/Workstations on desktops and also provides the interface, via the LBT155 module to the LIGHT Peripheral node which provides interfaces to each desktop telephone set.

The LIGHT Peripheral node provides interfaces to support industry standard desktop analog '2500' series telephone sets and Mitel's SuperSet 400 series of advanced feature phones. Each Peripheral node can handle up to 12 interface 'line' cards, each of which supports 16 desktop interfaces for a total of 192 ports or desktop phones supported. Different line cards are required for analog (ONS) and SuperSet 400 series (DNIC) sets.

The Collapsed Backbone function is typically handled by either Mitel LET-36 (18 slot) or LET-20 (10 slot) MultiNet hubs depending on the size of the customer installation and LAN interface requirements. The LET-36 must be equipped with redundant power supplies when using the LBT155 backbone module. Due to power supply limitations a maximum of five LBT155 Backbone modules may be configured in a LET-36 hub.

Given a limit of five LBT155's in a LET-36 hub and the need to support local LAN segments and dedicated links to computing servers, the Collapsed Backbone function may need to be expanded across multiple hubs. The example maximum size configuration using LET-36 hubs is shown in FIG. 4. This diagram assumes all LIGHT nodes (except the MC Node) are interfaced via Workgroup hubs.

An inter-hub link must be provided for packet data traffic between hubs. The interhub link may be any switched Ethernet interface card (eg. LSE108,208,808) or a MultiNet Backbone module such as the LHB (proprietary 100 Mbps), LSA (ATM 155 Mbps), LSF100 (FDDI 100 Mbps). An LBT155 module may also be used. Higher bandwidth cards should be used if inter-group LAN traffic is high.

The Workgroup Hub 20 may be any model of MultNet hub (LET10,20,36) depending on the needs of the workgroup LAN environment. A Workgroup hub supports one LBT155 Backbone module product as shown in FIG. 5. The remainder of the hub slots can be used for LAN interface modules and any other MultiNet compatible modules required for the particular application.

The SX-2000 LIGHT system nodes when configured for use in a product as shown in FIG. 2, will operate and provide the same set of telephony features and services as provided in the standard SX2000 LIGHT product.

The number of voice lines (phones) and WAN trunks supported is identical to an existing LIGHT system equipped with the same software release and hardware options. The system performance index (PI) is unaffected by the backbone network.

Figure 6:
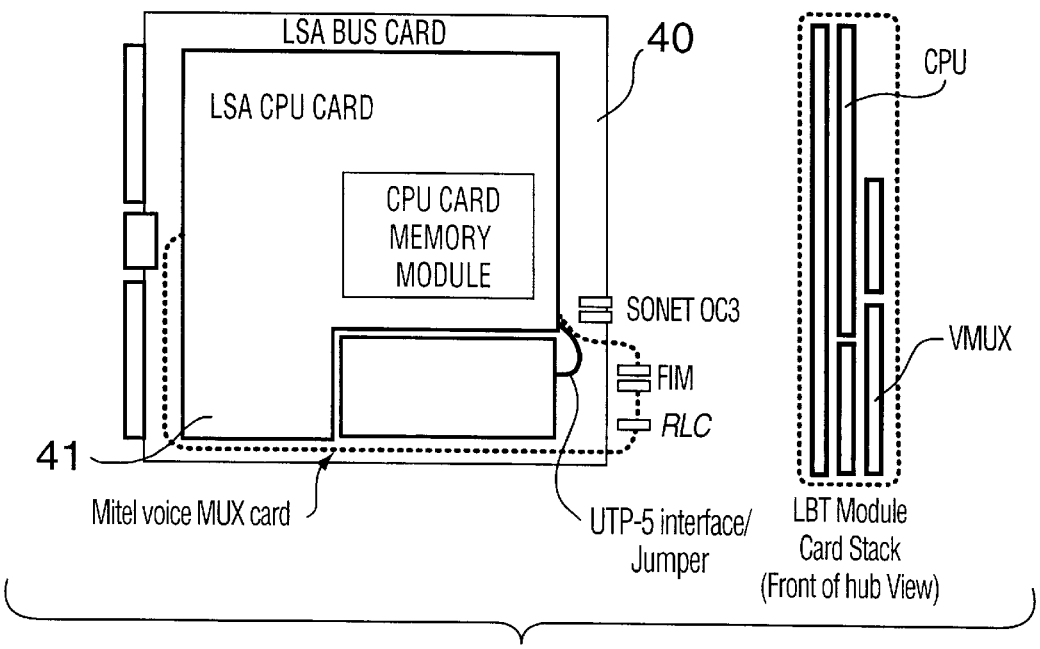
FIG. 6 is a block diagram of an LBT backbone interface module.

The LBT155 card 31 is based on the Lannet LSA155 card design as shown in FIG. 6. The LSA module's purpose is to allow a MultiNet hub to interwork with an ATM network using standardized ATM LAN Emulation protocols.

The LSA functions in a point-to-point protocol mode to implement the collapsed backbone architecture.

The LBT is created by adding a VMUX card 41 to the LSA 40 module (see FIG. 6). The VMUX allows TDM voice traffic originating from LIGHT nodes to be multiplexed onto a 155 Mb/s physical layer backbone along with ATM cells generated by the LSA. The LSA is a two-slot module with 3 major cards, namely a Bus Card, a CPU card and a Fore ATM OC3 NIC. The LBT application of the LSA uses the Bus/CPU card set but replaces the Fore SBA-200E OC3 NIC card with an unshielded twisted pair category 5 (UTP5) version since the VMUX itself contains the backbone OC3 interface.

FIG. 6 shows the approximate physical packaging of the LSA and LBT modules including the card stack profile of the LBT card.

The LSA sub-assembly is defined as that portion of the LSA required to build the LBT155 module. Currently this is defined as the full LSA minus the Fore SBA-200E OC3 NIC and LSA faceplate. The LBT is built by adding a Fore SBA-200E UTP5 NIC, the VMUX card and LBT faceplate.

Figure 7:
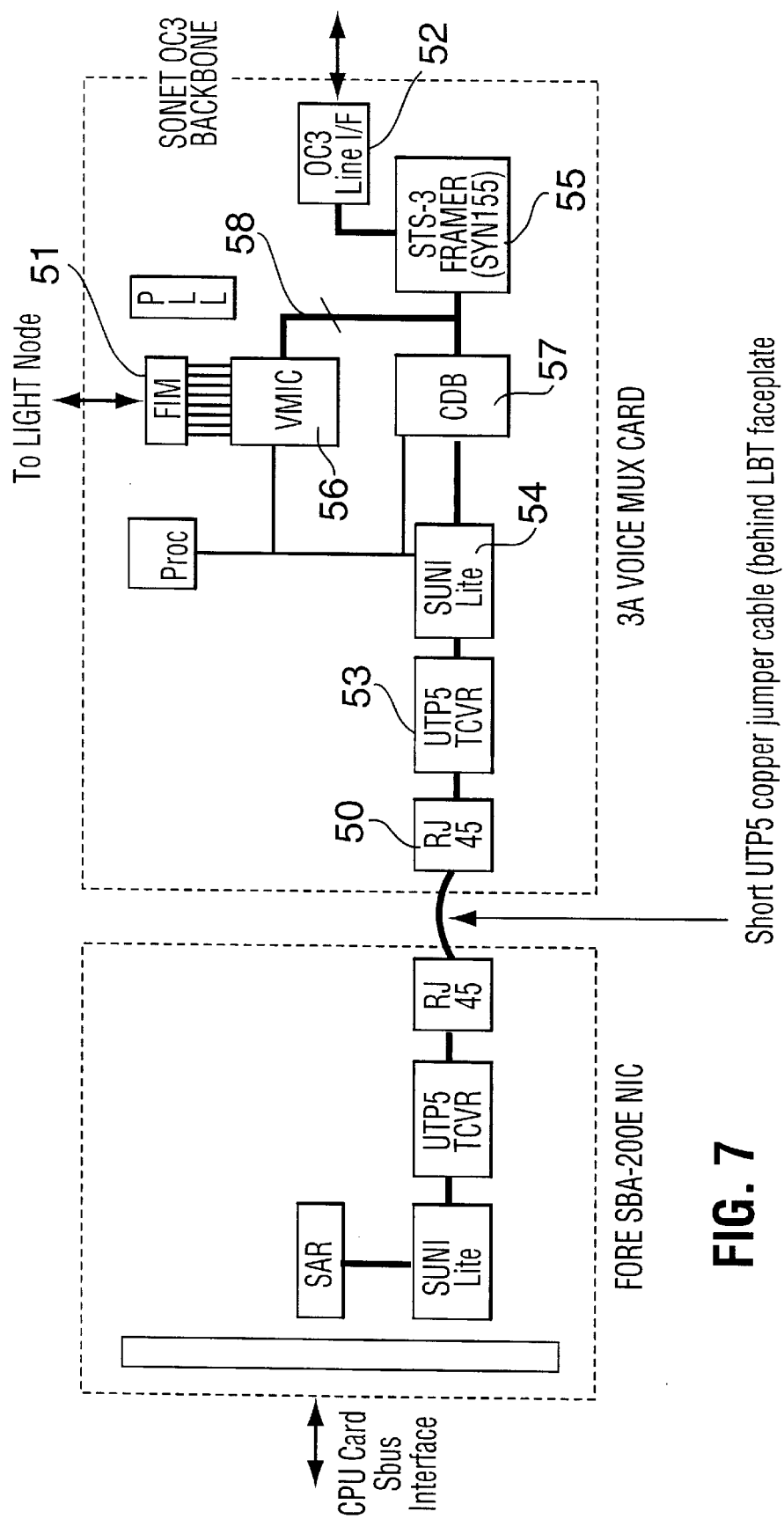
FIG. 7 is a simplified block diagram of a Vmux card.

The SBA-200E NIC is an add-in ATM interface card designed for Sun workstations and is being used by Lannet for Ethernet packet to ATM cell conversion in the LSA. The UTP5 version of this card used in the LBT supports the ATM Forum's Physical Medium Dependent Interface Specification for 155 Mb/s over Twisted Pair Cable. The card also supports the ATM Forum's User to Network Interface Ver: 3.1 standard A simplified block diagram of the Voice Multiplexor card 41 is shown in FIG. 7 along with elements it interfaces to. The VMUX 41 handles the multiplexing of TDM voice channels (ST links) with the ATM cell traffic from the LSA/Fore NIC cards. The VMUX has four 'external' interface points, namely a 155 Mb/s UTP-5 port 50 to interface to the SBA-200E adaptor card, a FIM (Fiber Interface Module) port 51 to interface to the SX2000 LIGHT nodes, an OC3 Backbone interface 52 to carry the combined voice and data traffic, and an interface to External Backbone Redundancy Unit.

The UTP-5 port 50 consists of an interface to the UTP-5 transceiver 53 (National TWISTER series) via an isolation transformer feeding the SUNI-Lite SONET framer device 54. The FIM interface 51 consists of the common circuitry associated with the Fiber Interface Module. The Backbone OC3 interface 52 is connected to the SYN155 STS-3c framer.

Between the three transport interfaces is the circuitry to mix the data and voice information. The two main devices upon which this muxing function is based are the Mitel Voice/MVIP Interface Circuit (VMIC) 56 and TranSwitch Cell Delineation Block (CDB) 57. The CDB 57 converts an ATM cell stream to an 8 bit parallel SONET TDM bus at a rate of 19.44 Mhz which feeds the OC3 framer device. The VMIC device 56 maps the 8 bidirectional ST links (512 channels) from the FIM into appropriate timeslots on 19.44 Mhz TDM parallel databus 58. The VMIC 56 allows these 512 channels to be inserted at any point within the Sonet STS-3c frame (or Synchronous Payload Envelope—SPE). In a related activity, the VMIC controls how many timeslots on the 19.44 bus that the CDB uses for ATM cell mapping. The CDB rate adapts the incoming cell stream from the Fore NIC to timeslots remaining after the voice timeslots have been inserted. The ATM SAR (Fore NIC) Peak Cell rate and other related SAR parameters must be adjusted to account for the loss of 16 Mb/sec in the STS-3c frame which have been dedicated to voice traffic.

The VMUX 41 is equipped with a manual selector mechanism to control whether the card operates as a master (collapsed backbone hub end) or slave card (workgroup hub end) with respect to clock generation/recovery and synchronization.

Figure 8:
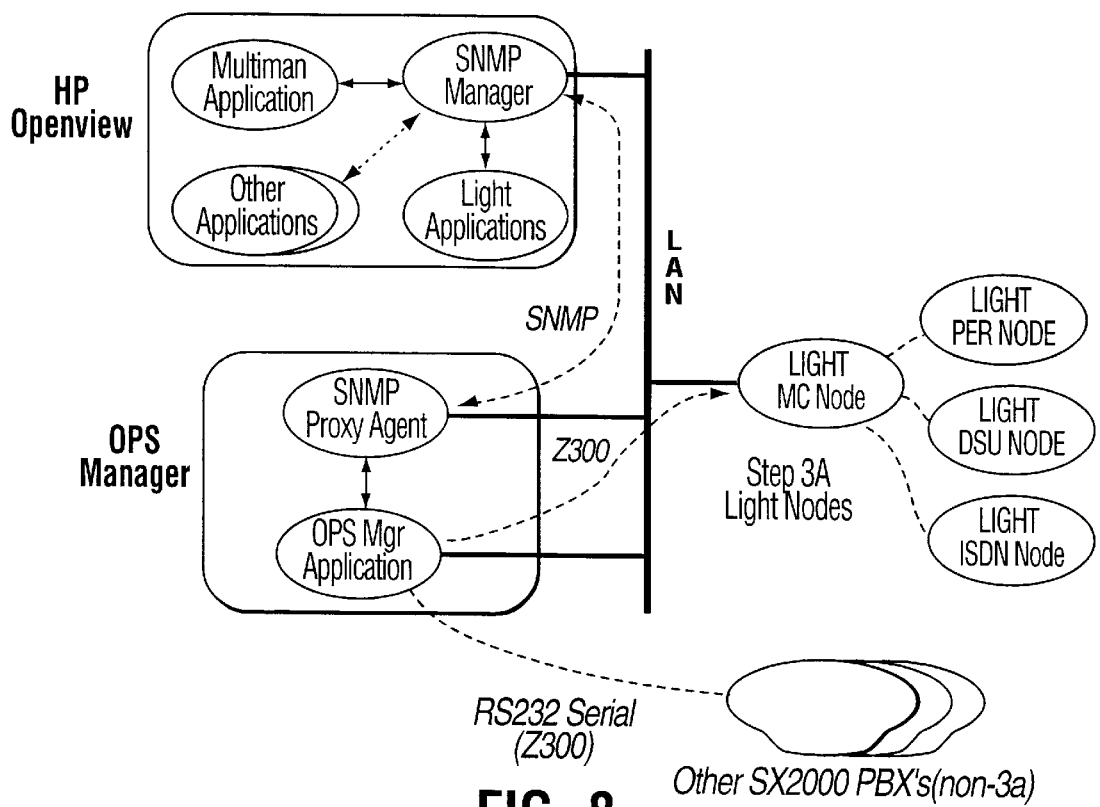
FIG. 8 shows the functional structure of the network management system.

As shown in FIG. 8, the network is top level managed from an HP/Openview (HPOV) based platform running both Multiman, the MultiNet LAN infrastructure management application, and a Telephony Alarms Management application. The MultiNet system components can all be managed from the HPOV/Multiman application; however, LIGHT system management and administration requires the use a separate OPS Manager network management platform that will incorporate an SNMP Proxy Agent for the LIGHT system.

A single LIGHT system is administered and managed primarily by two software applications—'Maintenance' and Customer Data Entry (CDE)' running in the Main Control node. Maintenance software runs in the background and monitors various HW/SW subsystems and interfaces for faults and alarms. CDE is run whenever the system database requires updating. The external user interface for both is a VT100 'Maintenance' Terminal . The ISDN and Application Gateway Nodes have separate management systems.

The OPS Manager platform 'front ends' the LIGHT system as it provides a convenient platform to implement an SNMP Proxy Agent which will provide basic system alarm status to the HP/Openview 'Enterprise' management system which will run a new Telephony Alarms Managament application. Ops Manager is designed to manage common elements of a multiple PBX network such as the corporate telephone directory and alarm statuses.

The Ops Manager also allows a customer if required to manage other PBX's in the corporate network. The OPS Manager application can be ported to the HP/OpenView platform to allow a single platform management implementation for lower cost.

The SNMP Agent and associated Management Information Base (MIB) provides OPS Manager with the ability to communicate with the HPOV Platform via the SNMP protocol. The HPOV SNMP Manager are able to retrieve information from OPS Manager by making SNMP requests to the SNMP Agent. The SNMP Agent will report any changes in alarm status to the SNMP Manager as well as the addition and removal of any LIGHT Main Control node in the network.

A convenient GUI to view the alarms information on the LIGHT system can be employed. This information, collected by the HPOV SNMP Manager, is the same LIGHT system alarms information that is currently viewable by the user on OPS Manager through the 'Alarms Viewing—Element' window. This gives the System Administrator the ability to monitor the stability of the LIGHT telephony network in conjunction with the data network. The administrator can view the current alarms information for the LIGHT telephony elements and then choose whether an alarm requires additional investigation by opening a remote session to Ops Manager.

HPOV provides an auto-discovery mechanism whereby IP devices are discovered by the SNMP Manager and displayed in the HP OpenView IP Topology Map. Additional discovery will be implemented to "auto-discover" LIGHT Main Control Nodes (one per Step 3A network) connected to the LAN via an Ethnet Interface card (ETI) in the MC node. Also discoverable will be MC nodes connected to Ops Manager via serial connections. Each Main Control will be displayed on a 'Telephony Network Map' in HPOV. The status of the LIGHT MC nodes and devices will be reflected in the Map.

To allow the System Administrator to further diagnose LIGHT system problems from HPOV console, a remote session window can be opened into Ops Manager. This allows easy access to any OPS Manager application to further examine any LIGHT system status change reported to the SNMP Manager on the HPOV. From the Ops Manager session, a further remote session window may be opened to the LIGHT system Maintenance Terminal from which detailed maintenance commands may be executed or CDE changes made.

Figure 9:
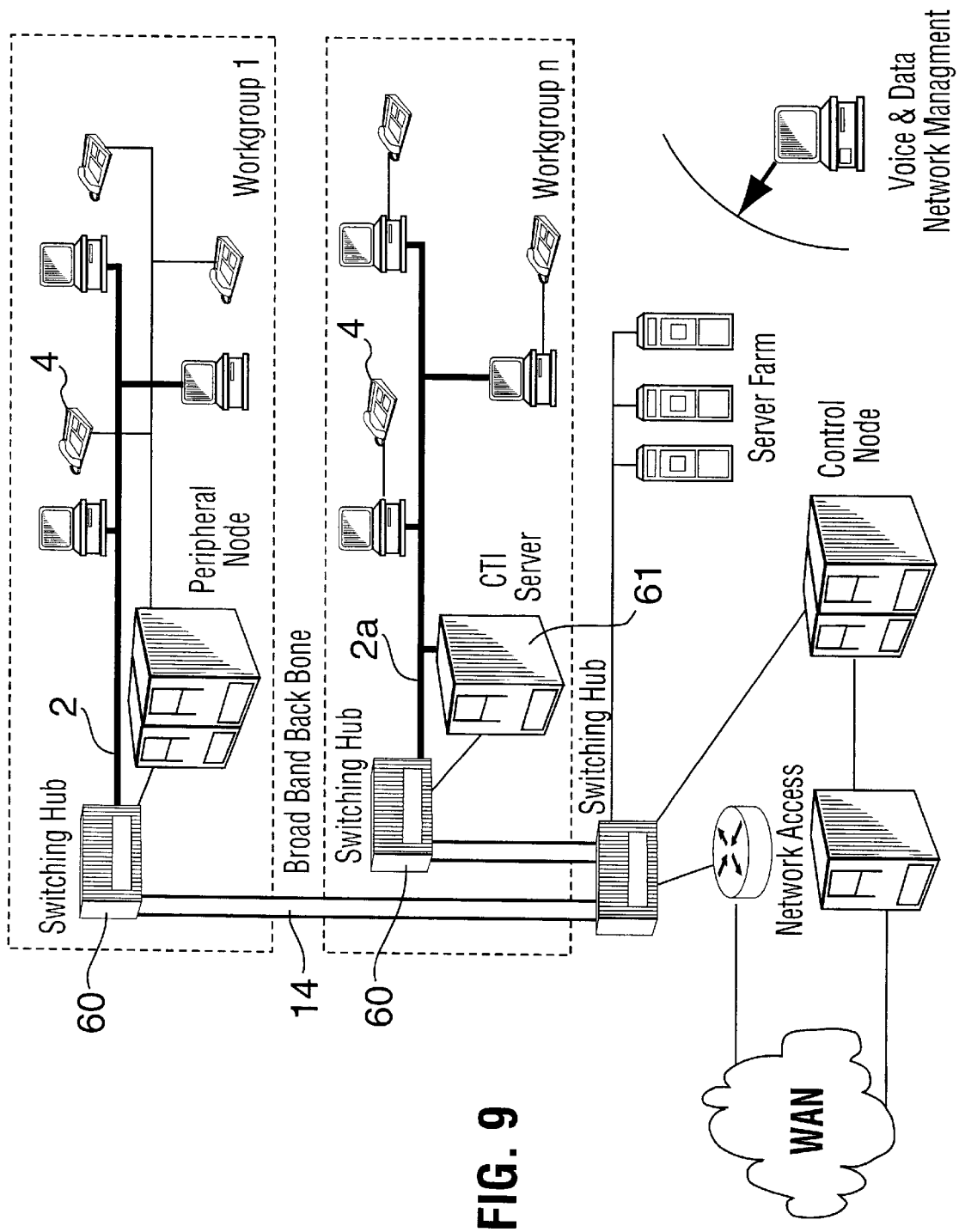
FIG. 9 is a block diagram of a further embodiment employing ATM to handle the switching.

In a still further embodiment, shown in FIG. 9, switching can be handled by the ATM network and the centralized TDM switch in the Main Control does not exist. The Main Control becomes a 'Telephony Call Server/Controller', which handles voice call routing and personal/workgroup feature activation. The data hub is the only interface to the desktop, the voice interface hub (LIGHT Peripheral previously) does not exist. Voice is now transported to the desktop (i.e. horizontal transport) over the LAN infrastructure, e.g. Ethernet, TokenRing or ATM.

In FIG. 9, ATM backbone 14 includes switching hubs 60, connected to Ethernet segments 2, 2a. Segment 2a is connected to a CTI server 61 and voice is transported to the telephone sets 4 directly in the Ethernet frames instead of via separate cabling.

I claim:

1. A merged voice and data communications system, comprising a TDM-based broadband backbone carrying packet data; a plurality of LAN segments interconnected via said broadband backbone; a plurality of telephone subsystems, each comprising a plurality of telephone circuits connected to a subsystem multiplexer; a central telephone controller; and means for establishing circuits to carry telephone traffic over said broadband backbone between said central controller and said several subsystem multiplexers independently of said packet data; whereby telephone calls can be routed over said broadband backbone to any of said telephone circuits without interfering with the packet data.

2. A merged voice and data network as claimed in claim 1, wherein bandwidth is reserved for telephone traffic over the broadband backbone to create circuits between said central controller and said subsystem multiplexers.

3. A merged voice and data network as claimed in claim 2, wherein said circuits are TDM channels.

4. A merged voice and data network as claimed in claim 1, wherein said circuits are permanent virtual channels established over an ATM network.

5. A merged voice and data network as claimed in claim 1, wherein each telephone subsystem includes a telephony controller cooperating with said central controller and communicating therewith over said broadband backbone.

6. A merged voice and data network as claimed in claim 5, wherein said telephony controller is connected to the associated subsystem multiplexer.

7. A merged voice and data network as claimed in claim 1, wherein said subsystem multiplexer includes an interface circuit for mapping telephone serial links into timeslots in a TDM frame.

8. A merged voice and data network as claimed in claim 7, wherein said TDM frame is a SONET frame.

9. A merged voice and data network as claimed in claim 8, wherein said serial links are multiplexed with ATM cells.

* * * * *